United States Patent Office 3,485,758
Patented Dec. 23, 1969

3,485,758
METHOD OF MAKING FLUORESCENT
MAGNETIC PARTICLES
James S. Borucki and Paul Kenneth Borrows, Chicago,
Ill., assignors to Magnaflux Corporation, Chicago, Ill.,
a corporation of Delaware
No Drawing. Filed June 27, 1967, Ser. No. 649,144
Int. Cl. G01n 27/82; C04b 35/26; H01f 1/37
U.S. Cl. 252—62.52
14 Claims

ABSTRACT OF THE DISCLOSURE

Method of making fluorescent magnetic particles for use in water or oil suspension in detecting flaws in magnetic objects. Magnetic particles and fluorescent thermoplastic resin pigments in finely divided form are mixed together to form a slurry in a liquid vehicle comprising a solution of a film-forming coating resin, or mixture of resins, in a relatively volatile, water miscible, lower molecular weight organic solvent. Water is added to the slurry in sufficient amount to cause the separation from the liquid admixture of discrete aggregates comprising cores of adherent mixed magnetic and fluorescent pigment particles encapsulated by the film-forming resin as a coating thereover.

CROSS-REFERENCE TO RELATED APPLICATION

This invention constitutes an improvement over the method disclosed in the co-pending sole application of Borrows Ser. No. 443,705, filed Mar. 29, 1965, of common ownership herewith.

BACKGROUND OF THE INVENTION

The field of this invention is the art relating to the preparation of fluorescent magnetic particles for use in the non-destructive testing of magnetizable metal workpieces for the detection of flaws, defects and other surface discontinuities. After application of a water or oil suspension of the fluorescent magnetic particles to the surface of a properly magnetized workpiece, the workpiece is inspected under filtered ultraviolet light, or "black-light," to observe any concentration pattern of fluorescent particles caused by a surface discontinuity.

The prior art includes the expired Switzer Patent No. 2,267,999 and the Kazenas Patent No. 2,936,287 relating, respectively, to lacquer bonded and resin bonded fluorescent magnetic particles for use in this field.

SUMMARY OF THE INVENTION

In accordance with the present invention, a magnetic powder, which may be a magnetic iron oxide, carbonyl iron, or a soft magnetic ferrite, is mixed under agitation and accompanying high shear forces, with a fluorescent pigment, which may suitably be a fluorescent dye solvated in a thermoplastic resin, e.g., a cyclic aminotriazine thermoplastic resin as disclosed in the Kazenas Patent No. 2,938,873. The resulting particulate admixture of adherent magnetic and fluorescent powders constitute the core of the fluorescent magnetic material of our invention when encapsulated in a coating of a film-forming resin. Such encapsulation is carried out by first forming a slurry of the adherent magnetic-fluorescent pigment particles in a solution of the film-forming coating resin in a relatively volatile, water miscible, low molecular weight ($C_1$–$C_5$), aliphatic solvent, and then adding water to the resulting slurry in a sufficient amount to effect the precipitation, as discrete aggregates, of core-forming magnetic-fluorescent pigment particles having a resinous coating thereover. Thereafter, the slurry of precipitated encapsulated magnetic-fluorescent pigment particles is subjected to filtering or centrifuging, or, preferably, to spray drying, to recover a dry fluorescent magnetic material in finely divided, discrete form.

Such fluorescent magnetic material is useful in the non-destructive testing of parts by the magnetic particle method employing black light to render the indications of surface discontinuities fluorescent. The fluorescent magnetic material of our invention can be used as a suspension in an aqueous medium, but is preferably used as a suspension in oil, since the resin coating encapsulating the adherently bonded magnetic and fluorescent pigment particles is relatively hydrophobic and not easily wetted with water unless a suitable surfactant is employed. Our material is satisfactorily resistant to the attrition that normally takes place during the circulation, as by pumping, of the water- or oil-suspended fluorescent magnetic material in the process used for detecting flaws or other discontinuities in magnetizable parts.

DESCRIPTION OF THE PREFERRED EMBODIMENTS

The magnetic materials that are preferred are the magnetic iron oxides, such as the magnetites, $Fe_3O_4$, gamma ferric oxide, $Fe_2O_3$, and magnetic ferrites, but carbonyl iron can also be used. These magnetic materials are available in finely divided form, having particle sizes generally between about 0.2 and 44 microns in maximum dimension. Carbonyl iron, specifically, is obtainable in spherical particle form of about 1 to 5 microns diameter.

For imparting fluorescence to the fluorescent magnetic material of our invention, we prefer to employ a fluorescent pigment consisting of a fluorescent dye solvated in a thermoplastic resin, particularly, one of the cyclic aminotriazine resins, such as a melamine-, or benzoquanaminesulfonamide-formaldehyde resin. Suitable fluorescent pigments of this type are available on the market from Lawter Chemical Company, under that company's proprietary name "Hi-Viz"; from Switzer Brothers, Inc., under its proprietary name "Day-glo"; and from Radiant Color Company, under its proprietary name "Velva-glo." In general, any fluorescent resin pigment can be used. Alternatively, although not so satisfactorily, resins and fluorescent dyes can be separately mixed with a magnetic powder and the fluorescent dye caused to be solvated by the resins in situ.

In the preferred step of mixing the magnetic and fluorescent pigment powders, such mixing is accomplished in liquid suspension in a blender or colloid mill under sufficiently high shear to effect a cohesion between the magnetic and fluorescent pigment particles due to the operation of Van der Wall forces. In general, the blade of the blender or the rotor of the colloid mill should be driven so as to rotate at a speed of at least 5400 and up to 7500 or even 12,000 r.p.m. Under the resulting shear due to high collision forces the finely powdered fluorescent pigment particles are caused to adhere directly to the finely powdered magnetic particles. The core-forming magnetic particles are within the size range of between about 0.2 micron and 50 microns, and the fluorescent pigment particles are in the neighborhood of ½ micron, or finer, maximum dimension.

As the film-forming, coating resin, we have found it most satisfactory to employ long chain linear polyamides derived from the reaction of dimerized linoleic acid with diamines or other polyamines, of the general formula—

$$HO(-OC-R-CONHR'-NH-)_nH$$

where R is a hydrocarbon group of an indeterminate configuration containing 34 carbon atoms, and R' is $-CH_2CH_2-$, and $n$ is an integer of 2 or higher. The polyamine generally used in the manufacture of a hard polyamide resin having a melting point of over 100° C. (capillary tube method) is ethylene diamine. Blends of the polyamide resins having the desired melting point of 100° C. can be used for our purposes. The preferred polyamide resins, which are of molecular weights averaging between 6000 and 9000, are thermoplastic; have sharp melting points between 105 and 115° C.; and are soluble in water-miscible, relatively volatile, aliphatic organic solvents, such as the $C_1$-$C_5$ alcohols, e.g., methanol ethanol (denatured), n-propanol, isopropanol and butanol; and in methyl ethyl ketone, acetone and mixtures thereof. By "relatively volatile," as used herein, boiling points of below about 120° C. are intended.

In the use of the polyamide resins, the resins are dissolved in isopropanol or any of the other aforementioned water-miscible volatile organic solvents. The premixed magnetic powder and fluorescent pigments are then added slowly to the resulting solution to form a slurry.

The subsequent addition of water in sufficient amount causes the separation from the liquid vehicle of discrete aggregates comprising cores of mixed magnetic and fluorescent pigment aggregates encapsulated by the resin as an adherent coating thereover.

It is our belief that the polyamide resins upon dilution of the solvent with water acquire a negative electrostatic charge, whereas the magnetic particles have a positive charge, and that because of the opposite charges on these particles, there is a tendency of the particles to be pulled together under the forces acting upon them and to adhere to each other.

This theory is similar to that described in the Damm Patent No. 3,185,589, but in that patent there is no suggestion of including a fluorescent dye or pigment, nor of preparing a resin-coated aggregate of magnetic and fluorescent pigments.

In addition to fluorescent dyes in the fluorescent resin pigments, the pigment can suitably contain fluorescent material that has been termed an "opacifier" in the aforesaid Borrows application.

In general, all materials which fluoresce blue-white and "cascade" the fluorescent dye, or dyes, used have proved satisfactory in increasing the fluorescent intensity. Fluoranthene, a fused polycyclic hydrocarbon is a suitable example.

The following examples, giving general and specific formulae and procedures will serve to illustrate the principles of our invention and how our method can be practiced to best advantage. It will be understood, however, that the examples are by way of illustration only and are not intended to limit the scope of our invention.

GENERAL

Ingredients: Parts by weight
    Magnetic powder _____ 100.
    Fluorescent pigment ___ 1–100.
    Film-forming resin _____ 2–10.
    Water miscible, volatile solvent _____ 100–500 or q.s. to dissolve the polyamide resin.
    Water _____ 400 or q.s. to effect precipitation of encapsulated magnetic-fluorescent pigment aggregates.

PROCEDURE (1) To a solution of the selected film-forming resin in a water miscible, volatile solvent are introduced the premixed magnetic-fluorescent pigment aggregates to form a slurry.

(2) To the resulting slurry, water is added in a sufficient amount to cause the film-forming resin to come out of the solution and, due to its opposite charge from that of magnetic particles, to coat the magnetic-fluorescent pigment aggregates and thus encapsulate them.

(3) The water-diluted slurry, containing precipitated and encapsulated magnetic fluorescent pigment aggregates, is then transferred to a suitable spray dryer, where the slurry is evaporated to dryness under relatively low temperatures, such that the dried aggregates are not subjected to temperatures in excess of about 100° C.

(4) The dried fluorescent magnetic particles from the dryer, containing less than 1% of moisture, are constituted by a core of the admixed magnetic-fluorescent pigment particles and an adhering coating thereover of the selected film-forming resin. This material can be used, as obtained and without grinding, as the magnetic-fluorescent-pigment material for use in fluorescent magnetic particle inspection for surface discontinuities.

Depending upon the purposes for which the fluorescent magnetic material of our invention is intended, the particle sizes can be varied from a large particle size, such as between 25 and 75 microns maximum dimension, for use in detecting surface discontinuities in large billets, to a relatively small particle size, such as between 3 and 25 microns in maximum dimension.

Example I

Ingredients: Parts by weight
    BK–245 magnetic iron oxide (C. K. Williams) _ 10.0
    Fluoranthene _____ 0.2
    Fluorescent pigment _____ 1.5
    Polymid resin #1060 (Lawter Chemical) ____ 0.8
    Isopropanol (anhydrous) _____ 10.0
    Water _____ Twice above vol.

Example II

BK–245 magnetic iron oxide _____ 8.0
    Lumogen _____ 0.5
    Polymid #1060 resin _____ 0.25
    Isopropanol (anhydrous) _____ 8.0
    Water _____ Twice above vol.

Example III

BK–245 magnetic iron oxide _____ 78
    Mapico 422 magnetic iron oxide (gamma $Fe_2O_3$) _____ 12
    Lumogen _____ 5.0
    Polymid #1060 _____ 5.0
    Isopropanol _____ 100
    Water _____ Twice above vol.

Example IV

Carbonyl iron powder Grade SF _____ 5.0
    Lumogen _____ 0.2
    Polymid #1060 _____ 0.1
    Isopropanol (anhydrous) _____ 10.0
    Water _____ Twice above vol.

Example V

7C iron powder _____ 5.0
    Lumogen _____ 1.5
    Polymid #1060 _____ 0.25
    Isopropanol (anhydrous) _____ 10.0
    Water _____ Twice above vol.

Example VI

9C iron powder _____ 5.0
    Lumogen _____ 1.5
    Polymid #1060 _____ 0.25
    Isopropanol (anhydrous) _____ 10.0
    Water _____ Twice above vol.

Example VII

| Ingredients: | Parts by weight |
|---|---|
| BK–250 (C. K. Williams) | 5.0 |
| Lumogen | 1.5 |
| Polymid #1060 | 0.25 |
| Isopropanol | 10.0 |
| Water | Twice above vol. |

Example VIII

| 1RN–300 (C. K. Williams) red iron oxide | 5.0 |
|---|---|
| Lumogen | 1.5 |
| Polymid #1060 | 0.25 |
| Isopropanol | 10.0 |
| Water | Twice above vol. |

Example IX

| Mapico 422 magnetic iron oxide | 5.0 |
|---|---|
| Lumogen | 1.5 |
| Polymid #1060 | 0.25 |
| Isopropanol | 10.0 |
| Water | Twice above vol. |

Example X

| M.O. 4526 | 5.0 |
|---|---|
| Lumogen | 1.5 |
| Polymid #1060 | 0.25 |
| Isopropanol | 10.0 |

Example XI

| M.O. 3528 | 5.0 |
|---|---|
| Lumogen | 1.5 |
| Polymid #1060 | 0.25 |
| Isopropanol | 10.0 |

Example XII

| RC–724 | 5.0 |
|---|---|
| Lumogen | 1.5 |
| Polymid #1060 | 0.25 |
| Isopropanol | 10.0 |

In place of isopropanol, any of the other relatively volatile, water-miscible, aliphatic organic solvents heretofore mentioned can be used to dissolve the film-forming resin in the proportion of between about 2 and 10% of resin by weight of the selected solvent, the amount of solvent in each case being sufficient to completely dissolve the film-forming resin. The amount of water added in the subsequent step must be sufficient to throw the film-forming resin out of solution, but the specific amount of water required for this purpose will vary depending upon the extent to which the solubility of the film-forming resin in selected solvent is lessened as its dilution with water is increased.

Lumogen is 2,2-dihydroxy 1,1-naphthaldazine and is available having a particle size of about 0.1 to 0.5 microns. Other fluorescent dyes can be used in place of Lumogen.

In general, room temperatures are used in the mixing and precipitating steps of our method.

The fluorescent magnetic material of our invention is preferably made available in dry, discrete form and in a number of different particle size ranges. The dry form of material serves to reduce shipping charges, but for some purposes the material is furnished as a concentrate, or paste, admixed with an oily vehicle to facilitate further dilution as an oil-suspension for actual use.

The material in a smaller particle size range is particularly suited for the detection of finer surface flaws. For this purpose, the magnetic core particles can be between 0.2 and 1 micron in maximum dimension, and can be either acicular in form, as in the case of gamma ferric oxide, having a length to width ratio of up to 5 to 1, or thereabouts, or can be of more nearly spherical form, as in the case of carbonyl iron, or can be more nearly cubic, as in the case of some forms of magnetic oxides.

For the detection of larger surface flaws, the particle size range of the magnetic core particles can suitably be from 7 to 25 microns in maximum dimension.

The weight ratio of fluorescent pigment to magnetic core particles can vary between 1 to 2 and 1 to 25, depending upon the size of the magnetic particles and, of course, the size and intensity of fluorescence of the fluorescent pigment particles and the intensity of fluorescence desired in the final fluorescent magnetic material.

In order to retain as much as possible of the fluorescent intensity of the fluorescent pigment, the film-forming resin selected for encapsulating the magnetic-fluorescent pigment core aggregates is one that is highly transparent to light rays in the spectrum of both the near-ultraviolet and the visible light. The long chain polyamide resins meet such requirement, and do so to a much greater extent than does a thermoset resin such as an epoxy resin.

The weight ratio of the film-forming resin to the magnetic core particles in our composition can vary between 1 to 10 and 1 to 50, again depending upon the particle size of the core-forming aggregate, the larger the size and density of such aggregates the lower the weight ratio.

The fluorescent magnetic particles making up our composition are believed to consist of individual aggregates of one or more magnetic particles (A) having fluorescent pigment particles (B) directly adherent to (A), and an enveloping or encapsulating layer of the film-forming resin (C) that is continuous over the core-forming adherent particles (A) and (B). By reason of the transparent character of the encapsulating layer of the film-formnig resin, the fluorescence intensity of the fluorescent pigment particles is realized to a maximum extent, and by reason of the direct adherence to and covering power of a plurality of fluorescent pigment particles in relation to the magnetic core particle, or particles, the natural dark color and opacity of such magnetic particle, or particles, are substantially masked by the fluorescent pigment particles. Our fluorescent magnetic material is thus able to meet or even exceed the standards of fluorescence intensity now set for fluorescent magnetic material presently available on the market.

Also, as previously stated, the composition of our invention, when used in fluorescent magnetic particle systems, resists attrition and break-down into individual particles of (A), (B) or (C) to an extent at least as satisfactory as present-day fluorescent magnetic particles, and evidences no greater lessening of fluorescence intensity on continued use in such systems than do presently commercial fluorescent magnetic materials where an epoxy resin is used to bond together the fluorescent and magnetic particles.

It will be understood that modifications and variations may be effected without departing from the scope of the novel concepts of the present invention.

We claim:

1. The method of making a fluorescent magnetic composition in discrete form, which comprises:

admixing a magnetic powder with a fluorescent resinous pigment powder under conditions of high impact shear forces to provide core-forming particles in which said pigment powder and said magnetic powder adhere to each other, incorporating with the resulting admixture of core-forming particles a solution of a film-forming resin having a melting point over 100° C. in a relatively volatile, water-miscible aliphatic solvent to form a slurry, said film forming resin being precipitatable from said solution by the addition of water, and adding sufficient water to said slurry to effect a precipitation of said film-forming resin as an adherent coating over said magnetic-fluorescent core-forming particles to encapsulate the same.

2. The method of claim 1, wherein, the fluorescent pigment is a fluorescent dye solvated in a cyclic aminotriazine-sulfonamide-aldehyde condensation product having a softening point of at least 100° C.

3. The method of claim 2, werein,
the solution is a solution of a polyamide resin having a molecular weight of between 6000 to 9000.

4. The method of claim 3, wherein,
the solvent in said solution is isopropanol.

5. The method of claim 1, wherein,
said film-forming resin is a long cain polyamide, said resin-encapsulated, magnetic-fluorescent, core-forming particles are separated from the remaining liquid portion of the slurry, and, without thereafter being ground, dried and recovered as fluorescent magnetic material in dry discrete, particulate form.

6. The method of claim 5, wherein,
said fluorescent pigment is a fluorescent dye solvated in a thermoplastic cyclic aminotriazine-sulfonamide-aldehyde condensation product having a softening point of at least 100° C., and
said drying step is carried out by spray drying.

7. The method of claim 6, wherein,
said polyamide resin having a molecular weight of between 6000 and 9000.

8. The method of claim 7, wherein.
the solvent in said solution is a $C_1$–$C_5$ alcohol.

9. The method of claim 7, wherein,
the water added is at least 40 times the weight of the polyamide resin in said slurry and the polyamide resin becomes negatively charged while the magnetic particles in said water-diluted slurry are positively charged, thereby enhancing the adherence of the polyamide resin as a coating over said magnetic-fluorescent, core-forming particles.

10. The method of making a fluorescent magnetic composition for use in the magnetic particle method of non-destructive testing which comprises:
mixing together under high impact shear forces ferromagnetic particles and fluorescent resin pigment particles to provide core-forming aggregates of adherent ferromagnetic-fluorescent pigment particles,
forming a solution of a long chain linear polyamide film-forming resin of an average molecular weight of between 6000 and 9000 in a relatively volatile, water-miscible $C_1$–$C_5$ aliphatic alcohol solvent,
mixing together said resin solution and said core aggregates to form a slurry,
adding to said slurry during agitation thereof an amount of water sufficient to precipitate said polyamide resin out of solution and cause the same to form a coating over said core aggregates to encapsulate the same,
spray drying the resulting slurry of polyamide resin-encapsulated core aggregates, and
without intermediate grinding thereof recovering said polyamide resin-encapsulated core aggregates in a substantially dry discrete form having a particle size ranging from 3 to 75 microns in maximum dimension,
said pigment resin and said film-forming resin having softening points of at least 100° C.

11. A fluorescent magnetic composition consisting essentially of:
a mass of a filming-resin, adherent magnetic-fluorescent pigment core-forming particles, said fluorescent pigment being a cyclic aminotriazine-sulfonamide-aldehyde condensation product having a softening point of at least 100° C. and having a fluorescent dye dissolved therein, said particles being in dry, discrete form.

12. A fluorescent magnetic composition as defined by claim 11, wherein,
said filming-resin is a polyamide resin having a molecular weight of between 6000 and 9000 and a melting point of over 100° C.

13. A fluorescent magnetic composition as defined by claim 12, wherein,
said magnetic core-forming particles are selected from the group consisting of magnetic iron oxides, carbonyl iron and mixed magnetic ferrites, and mixtures of any thereof.

14. A fluorescent magnetic composition as defined by claim 13, wherein,
said core-forming particles consist essentially of said fluorescent pigment particles directly adhering to said magnetic particles, said polyamide resin provides a continuous coating over and encapsulating said core-forming particles, the resulting encapsulated particles are each substantially within the range of from 3 to 75 microns in maximum dimension, and said composition is within the following range expressed in parts by weight:
100 parts magnetic material
1–100 parts fluorescent pigment
2–10 parts polyamide resin.

References Cited

UNITED STATES PATENTS

| | | | |
|---|---|---|---|
| 2,938,873 | 5/1960 | Kazenas | 252—301.2 |
| 3,185,589 | 5/1965 | Damm | 252—62.54 X |
| 3,404,093 | 10/1968 | Borrows. | |

FOREIGN PATENTS

| | | |
|---|---|---|
| 979,763 | 1/1965 | Great Britain. |

TOBIAS E. LEVOW, Primary Examiner

J. COOPER, Assistant Examiner

U.S. Cl. X.R.

252—62.54, 301.3, 408